(12) United States Patent
Rao et al.

(10) Patent No.: US 9,097,549 B1
(45) Date of Patent: Aug. 4, 2015

(54) LEARNING AUTOMATED VEHICLE

(71) Applicant: Ford Global Technologies, LLC, Dearborn, MI (US)

(72) Inventors: Manoharprasad K. Rao, Novi, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/215,350

(22) Filed: Mar. 17, 2014

(51) Int. Cl.
*G01C 22/00* (2006.01)
*G01C 21/34* (2006.01)
*G05D 1/00* (2006.01)

(52) U.S. Cl.
CPC .................................. *G01C 21/3484* (2013.01)

(58) Field of Classification Search
CPC ....... G05D 1/00; G05D 1/024; G05D 1/0242; G05D 1/0272; G05D 1/0278
USPC ...................... 701/23–26, 410–411, 420–421
See application file for complete search history.

(56) References Cited

U.S. PATENT DOCUMENTS

| | | | |
|---|---|---|---|
| 8,467,951 B2 * | 6/2013 | Husain ........................... | 701/117 |
| 8,706,409 B2 * | 4/2014 | Mason et al. ................. | 701/424 |
| 8,755,837 B2 * | 6/2014 | Rhoads et al. ............. | 455/556.1 |
| 2001/0025222 A1 * | 9/2001 | Bechtolsheim et al. ...... | 701/209 |
| 2007/0124029 A1 | 5/2007 | Hattori et al. | |
| 2008/0177994 A1 * | 7/2008 | Mayer ................................ | 713/2 |
| 2009/0248285 A1 * | 10/2009 | Bauer ........................... | 701/117 |
| 2010/0069035 A1 * | 3/2010 | Johnson ..................... | 455/404.1 |
| 2010/0253918 A1 * | 10/2010 | Seder et al. ...................... | 353/13 |
| 2012/0083960 A1 * | 4/2012 | Zhu et al. ......................... | 701/23 |
| 2012/0179361 A1 * | 7/2012 | Mineta et al. ................. | 701/410 |
| 2012/0323690 A1 * | 12/2012 | Michael ..................... | 705/14.58 |
| 2013/0024060 A1 * | 1/2013 | Sukkarie et al. ................ | 701/22 |
| 2014/0309885 A1 * | 10/2014 | Ricci .............................. | 701/41 |

FOREIGN PATENT DOCUMENTS

| | | |
|---|---|---|
| JP | 03273405 | 12/1991 |
| JP | 07108849 | 4/1995 |
| JP | 07191723 | 7/1995 |
| JP | 2008180591 | 8/2008 |

\* cited by examiner

*Primary Examiner* — Mary Cheung
*Assistant Examiner* — Atul Trivedi
(74) *Attorney, Agent, or Firm* — Frank MacKenzie; Bejin Bieneman PLC

(57) ABSTRACT

A vehicle includes a navigation system and a processing device. The navigation system determines a route from a current location to a selected destination. The processing device applies a template to the route. The template represents driving trends associated with a geographic region. The processing device adjusts the route based on the template prior to the vehicle embarking on the route.

20 Claims, 2 Drawing Sheets

LEARNING AUTOMATED VEHICLE

BACKGROUND

Drivers who frequent certain areas learn the best routes to take, including which areas to avoid and which intersections are busiest during rush hour. Learning these routes takes time and intuition, however. Drivers who are inexperienced with a geographic area, such as new drivers or drivers that recently moved into the geographic area, need time to learn how to best navigate the area. One way to expedite such learning is to ask someone with more experience driving in that area. Different drivers have different priorities, however. For example, one driver may wish to drive on freeways as much as possible, even if that means sitting through traffic. Another driver may wish to reach his or her destination as soon as possible despite travelling a longer distance or reducing fuel economy. Therefore, the question of how to best navigate a geographic area is somewhat subjective relative to the driver's priorities.

DETAILED DESCRIPTION

An exemplary vehicle includes a navigation system and a processing device. The navigation system determines a route from a current location to a selected destination. The processing device applies a template to the route. The template represents driving trends associated with a geographic region. The processing device adjusts the route based on the template prior to the vehicle embarking on the route. Accordingly, the driver may operate the vehicle in a way that avoids, e.g., high traffic areas, high crime areas, etc. Moreover, when implemented in an autonomous vehicle, the vehicle can avoid such areas without any driver intervention.

The vehicle and system shown in the FIGS. may take many different forms and include multiple and/or alternate components and facilities. The exemplary components illustrated are not intended to be limiting. Indeed, additional or alternative components and/or implementations may be used.

Figure 1:
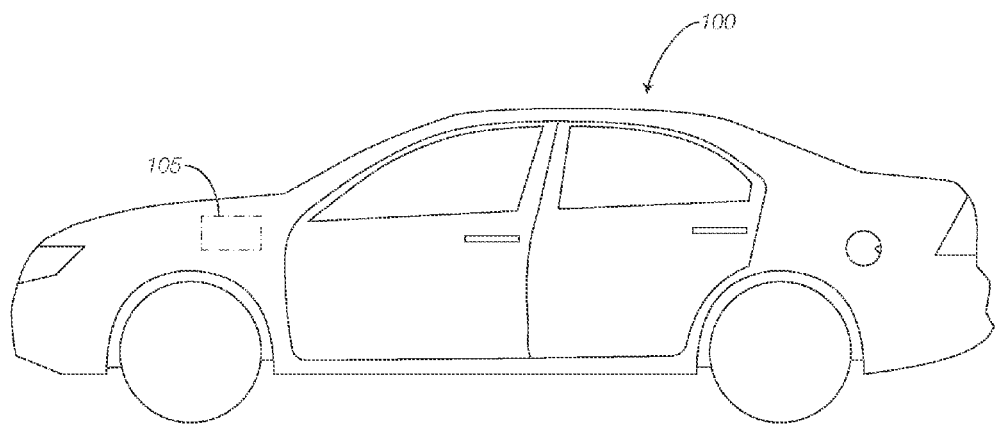
FIG. 1 illustrates an exemplary vehicle configured to select routes that best coincide with a user's preferences.

As illustrated in FIG. 1, the vehicle 100 includes a system 105 for adjusting automatically generated routes in accordance with a user's preferences. The system 105 is shown and described in greater detail below with reference to FIG. 2. Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

Figure 2:
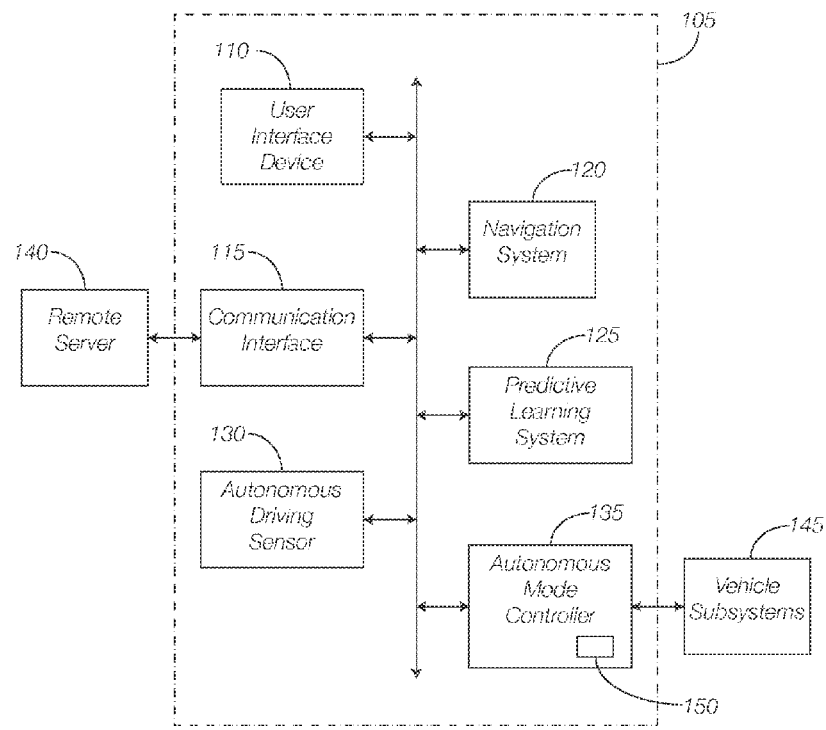
FIG. 2 is a diagram of an exemplary system that may be used in the vehicle of FIG. 1.

FIG. 2 is an exemplary diagram of the components of the system 105 shown in the vehicle 100 of FIG. 1. The system 105, as illustrated, includes a user interface device 110, a communication interface 115, a navigation system 120, a predictive learning system 125, at least one autonomous driving sensor 130, and an autonomous mode controller 135.

The user interface device 110 may be configured to present information to a user, such as a driver, during operation of the vehicle 100. Moreover, the user interface device 110 may be configured to receive user inputs. Thus, the user interface device 110 may be located in the passenger compartment of the vehicle 100. In some possible approaches, the user interface device 110 may include a touch-sensitive display screen.

The navigation system 120 may be configured to determine a position of the vehicle 100, such as a current location of the vehicle 100. The navigation system 120 may include a Global Positioning System (GPS) receiver configured to triangulate the position of the vehicle 100 relative to satellites or terrestrial based transmitter towers. The navigation system 120, therefore, may be configured for wireless communication. The navigation system 120 may be further configured to develop routes from the current location to a selected destination, as well as display a map and present driving directions to the selected destination via, e.g., a user interface device 110. In some instances, the navigation system 120 may develop the route according to a user preference. Examples of user preferences may include maximizing fuel efficiency, reducing travel time, travelling the shortest distance, or the like.

The communication interface 115 may be configured to facilitate wired and/or wireless communication between the components of the vehicle 100 and other devices. For instance, the communication interface 115 may be configured to receive messages from, and transmit messages to, a cellular provider's tower and the vehicle's Telematics Service Delivery Network (SDN) that, in turn, establishes communication with a user's mobile device such as a cell phone, a tablet computer, a laptop computer, a fob, or any other electronic device configured for wireless communication via a secondary or the same cellular provider. Cellular communication to the vehicle's telematics transceiver through the SDN may also be initiated from an internet connected device such as a PC, Laptop, Notebook, or WiFi connected phone. The communication interface 115 may also be configured to communicate directly from the vehicle 100 to the user's remote device or any other device using any number of communication protocols such as Bluetooth®, Bluetooth® Low Energy, or WiFi. Accordingly, the communication interface 115 may be configured to receive messages from and/or transmit messages to the remote server 140.

The predictive learning system 125 may be configured to select templates associated with various geographic regions, including the geographic region of the current location of the vehicle 100 as determined by the navigation system 120. Each template may represent driving trends associated with the geographic region. The driving trends may relate to safety information, infrastructure information, convenience information, and/or traffic flow information relative to the geographic region. The safety information may identify high crime areas and/or areas where accidents often occur. The infrastructure information may identify hospitals, police stations, fire stations, educational institutions, etc. Moreover, the infrastructure information may further identify retirement homes, preschools, parks, attractions (zoos, theme parks, stadiums, etc.), and areas where one or more handicapped persons reside. The convenience information may identify high ticket areas, a large employer site (e.g., a factory or hospital at the time of a shift change or a large office building at the beginning or end of prime working hours), timing for bridge openings to let boat traffic through, timing of major sports events at major stadiums, train schedules, etc. The traffic flow information may identify typical high traffic areas during, e.g., rush hour, whether certain lanes change direction of traffic flow throughout the day (e.g., inbound to a major metropolitan area in the morning and outbound to the suburbs in the evening), express lanes that bypass certain areas, whether roads are closed due to construction, an accident, or an event such as a marathon, parade, Grand Prix road race, political rally, or the like. The traffic flow information may further identify areas with high pedestrian traffic that often cause traffic jams.

The predictive learning system 125 may incorporate a neural network, fuzzy logic, or another engine for learning the best possible routes. In some instances, the predictive learning system 125 may develop the template based on how the driver operates the vehicle 100 in a non-autonomous mode. Alternatively or in addition, the predictive learning system 125 may be configured to receive the template from a remote server 140. In some possible approaches, the predictive learning system 125 may request the template associated with the geographic region from the remote server 140. Alternatively, the navigation system 120 may transmit the current location and selected destination to the remote server 140, and in response, the remote server 140 may transmit one or more templates to the predictive learning system 125 via, e.g., the communication interface 115. Moreover, the predictive learning system 125 may be configured to receive templates developed from other drivers either from the remote server 140 or by vehicle-to-vehicle communication. In some instances, the predictive learning system 125 may update the available or received template based on how the driver operates the vehicle 100 in a non-autonomous mode.

The autonomous driving sensors 130 may include any number of devices configured to generate signals that help navigate the vehicle 100 while the vehicle 100 is operating in the autonomous (e.g., driverless) mode. Examples of autonomous driving sensors 130 may include a radar sensor, a lidar sensor, a vision sensor, or the like. The autonomous driving sensors 130 help the vehicle 100 "see" the roadway and the vehicle 100 surroundings and/or negotiate various obstacles while the vehicle 100 is operating in the autonomous mode.

The autonomous mode controller 135 may be configured to control one or more subsystems 145 while the vehicle 100 is operating in the autonomous mode. Examples of subsystems 145 that may be controlled by the autonomous mode controller 135 may include a brake subsystem, a suspension subsystem, a steering subsystem, and a powertrain subsystem. The autonomous mode controller 135 may control any one or more of these subsystems 145 by outputting signals to control units associated with these subsystems 145. The autonomous mode controller 135 may control the subsystems 145 based, at least in part, on signals generated by the autonomous driving sensors 130.

The autonomous mode controller 135 may include a processing device 150 configured to apply one or more templates to the routes generated by the navigation system 120. The processing device 150 may update the routes generated by the navigation system 120 based on the template. While shown as part of the autonomous mode controller 135, in some instances, the processing device 150 may exist independently of the autonomous mode controller 135. Whether part of the autonomous or non-autonomous operation of the vehicle 100, the processing device 150 may apply the template prior to the vehicle 100 embarking on the route generated by the navigation system 120.

The processing device 150 may apply the template consistent with the user preferences. As discussed above, the user preferences may relate to maximizing fuel efficiency, reducing travel time, travelling the shortest distance, or the like. Thus, even though the updated routes generated by the processing device 150 may deviate from the original routes generated by the navigation system 120, the updated routes may still satisfy the user's preferences. In some possible implementations, the processing device 150 may prioritize the user's preferences relative to the updated route. For example, if the user preference places a high priority on travelling the shortest distance but the template updated route preference to, e.g., avoid a high traffic area would significantly increase the distance to the selected destination, the updated route may be discarded. In some possible approaches, the processing device 150 may prompt the user, via, e.g., the user interface device 110, to select whether to apply the updated route or the original route. The user may make such a selection via the user interface device 110.

Figure 3:
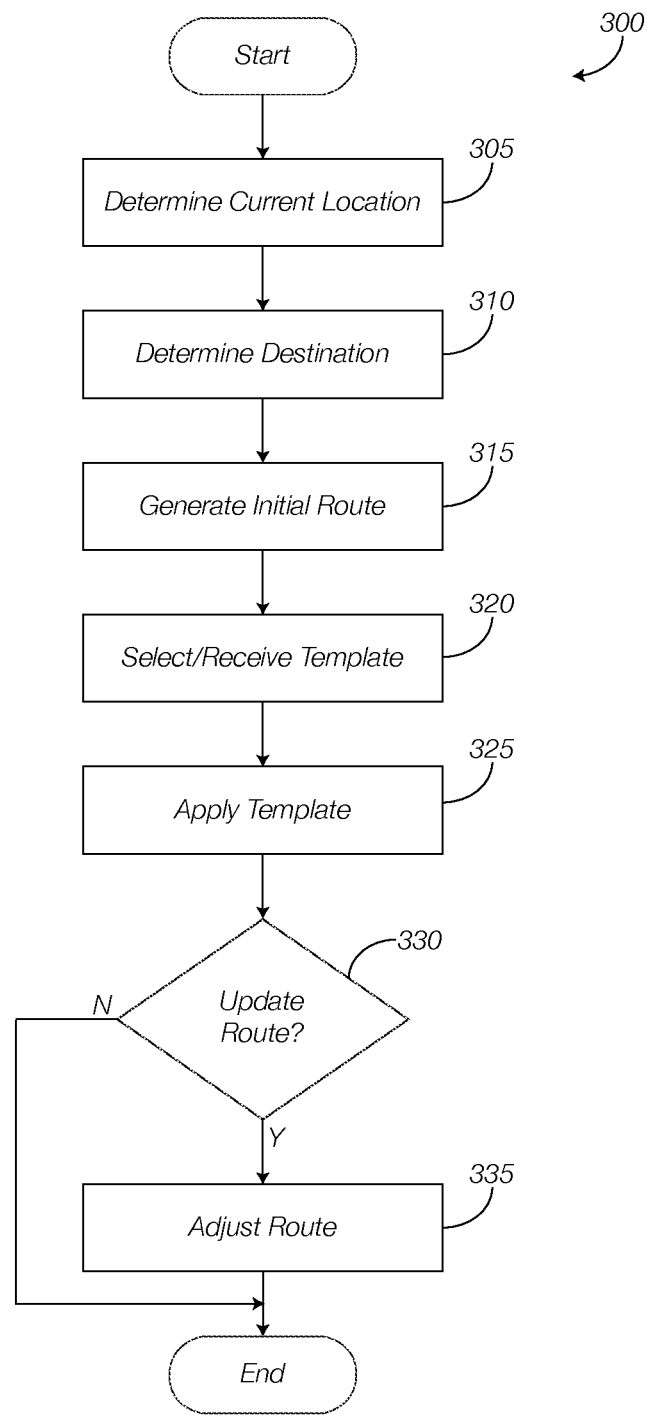
FIG. 3 is a flowchart of an exemplary process that may be used to select the route that coincides with the user's preferences.

FIG. 3 is a flowchart of an exemplary process 300 that may be implemented by one or more components of the system 105 of FIG. 2. For example, the process may be executed by the navigation system 120, the predictive learning system 125, and/or the processing device 150.

At block 305, the processing device 150 may determine a current location of the vehicle 100. The current location may be determined by the navigation system 120 using, e.g., GPS.

At block 310, the processing device 150 may determine the destination. The destination may be selected via a user input provided to the user interface device 110. The user interface device 110 may transmit the selection to the navigation system 120. The user interface device 110 or the navigation system 120 may transmit the selected destination to the processing device 150.

At block 315, the navigation system 120 may generate a route from the current location to the selected destination. The route may consider user preferences such as maximizing fuel efficiency, reducing travel time, travelling the shortest distance, or the like. The user preferences may be prioritized in accordance with a user input provided via the user interface device 110.

At block 320, the predictive learning system 125 may select and/or receive a template for the route generated at block 315. The template may represent driving trends associated with the geographic region of the current location of vehicle 100, the selected destination, and the route between the current location and the selected destination. As previously discussed, the driving trends may relate to safety information, infrastructure information, convenience information, and/or traffic flow information relative to the geographic region. The template may be selected from, e.g., a remote server 140 or received at the communication interface 115 from another vehicle via a vehicle-to-vehicle communication protocol.

At block 325, the processing device 150 may apply the template to the route generated at block 315. Applying the template to the route may include determining whether the vehicle 100 will be affected by any driving trends defined by the template while travelling the route.

At decision block 330, the processing device 150 may prompt, via the user interface device 110, the driver or other passenger whether to update the route based on the template. If the driver or other passenger elects to update the route based on the template, the process 300 may continue at block 335. If not, the process 300 may end so that the initial route may be used to navigate the vehicle 100.

At block 335, the processing device 150 may adjust the route based on the template prior to the vehicle 100 embarking on the route and/or prior to the vehicle 100 operating in an autonomous mode of operation. Adjusting the route may include updating the route to avoid or be otherwise unaffected or minimally affected by the driving trends. In some instances, the route may be adjusted in a manner that best considers the user's preferences discussed above. Thus, the updated route may, for instance, attempt to maximize fuel efficiency, reduce travel time, or travel the shortest distance based on how the user has prioritized these and possibly other user preferences. The process 300 may end after the route is adjusted and the updated route created so that the updated route may be used to navigate the vehicle 100.

In general, computing systems and/or devices, such as the user interface device 110 and the processing device 150, may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
a navigation system configured to determine a route from a current location to a selected destination; and a processing device programmed to apply a template to the route, wherein the template represents a plurality of driving trends associated with avoiding areas of a geographic region along the route, and wherein the processing device is programmed to adjust the route based on the template prior to the vehicle embarking on the route.

2. The vehicle of claim 1, wherein the navigation system is programmed to determine the route based on at least one user preference, and wherein the processing device is programmed to ignore the template if the template is inconsistent with the user preference.

3. The vehicle of claim 2, wherein the user preference is based on at least one of fuel efficiency and travel time to the selected destination.

4. The vehicle of claim 1, further comprising a predictive learning system configured to select the template.

5. The vehicle of claim 4, wherein the predictive learning system is configured to select the template based on a geographic region associated with the current location.

6. The vehicle of claim 4, wherein the predictive learning system is configured to receive the template from a remote server.

7. The vehicle of claim 1, wherein the template defines at least one of safety information, infrastructure information, convenience information, and traffic flow information associated with avoiding areas of the geographic region.

8. The vehicle of claim 1, wherein the processing device is incorporated into an autonomous mode controller configured to operate the vehicle in an autonomous mode.

9. The vehicle of claim 1, wherein the processing device is configured to update the template based at least in part on a user input.

10. A vehicle comprising:
an autonomous driving sensor;
an autonomous mode controller configured to control at least one vehicle subsystem in accordance with signals output by the autonomous driving sensor when operating in an autonomous mode; and
a navigation system configured to determine a route from a current location to a selected destination;
wherein the autonomous mode controller includes a processing device programmed to apply a template to the route, wherein the template represents a plurality of driving trends associated with avoiding areas of a geographic region, and wherein the processing device is programmed to adjust the route based on the template prior to the autonomous mode controller operating in the autonomous mode.

11. The vehicle of claim 10, wherein the navigation system is programmed to determine the route based on at least one user preference, and wherein the processing device is programmed to ignore the template if the template is inconsistent with the user preference.

12. The vehicle of claim 11, wherein the user preference is based on at least one of fuel efficiency and travel time to the selected destination.

13. The vehicle of claim 10, further comprising a predictive learning system configured to select the template.

14. The vehicle of claim 13, wherein the predictive learning system is configured to select the template based on a geographic region associated with the current location.

15. The vehicle of claim 13, wherein the predictive learning system is configured to receive the template from a remote server.

16. The vehicle of claim 10, wherein the template defines at least one of safety information, infrastructure information, convenience information, and traffic flow information associated with avoiding areas of the geographic region.

17. The vehicle of claim 10, wherein the processing device is configured to update the template based at least in part on a user input.

18. A method comprising:
determining a current location of a vehicle;
determining a destination of the vehicle;
generating a route based at least in part on the current location and the destination;
applying a template to the route, the template representing a plurality of driving trends associated with avoiding areas of a geographic region; and
adjusting the route based on the template prior to the vehicle embarking on the route.

19. The method of claim 18, further comprising selecting the template based at least in part on the geographic region.

20. The method of claim 18, further comprising requesting the template from a remote server.

* * * * *